UNITED STATES PATENT OFFICE.

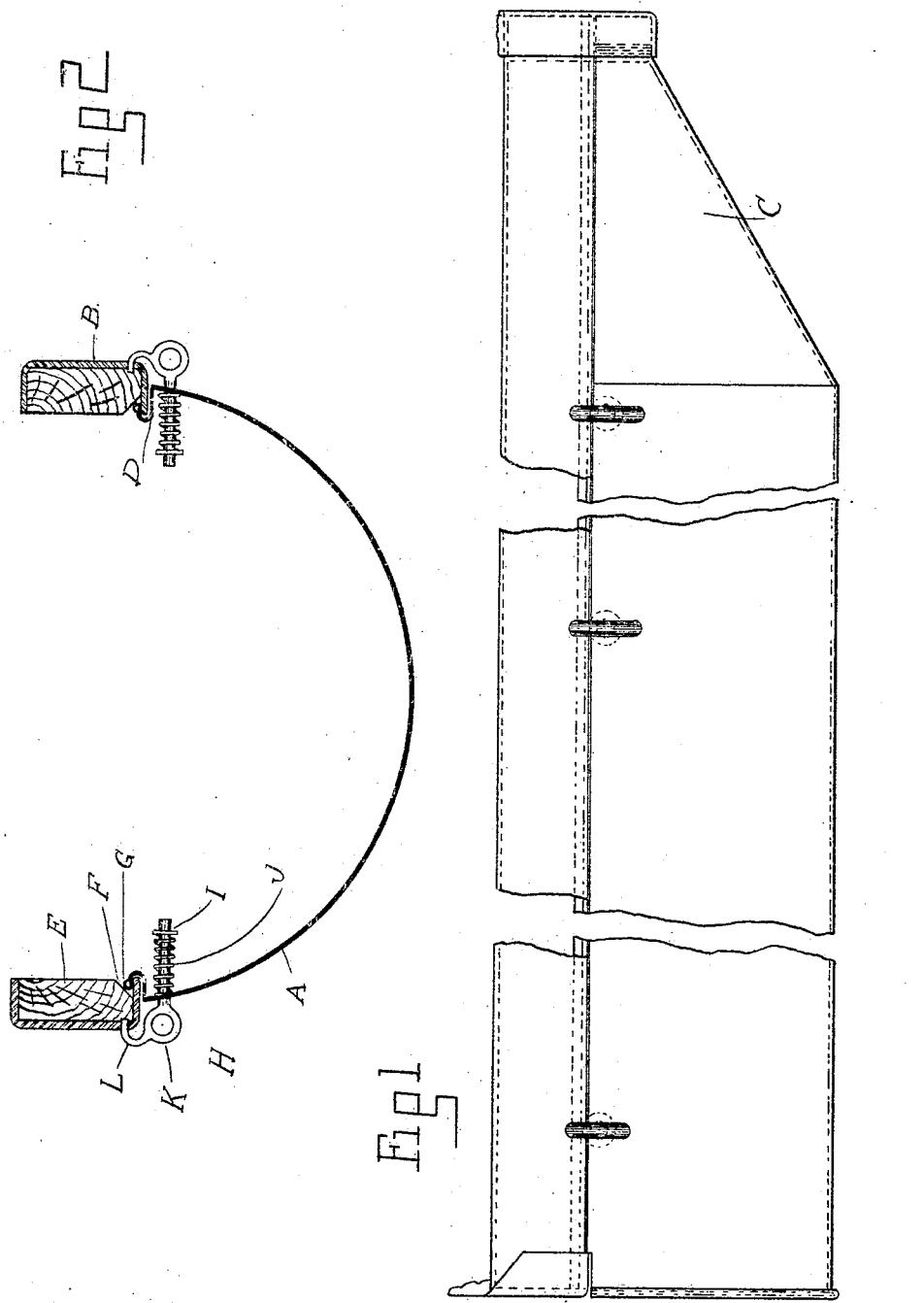

HOWARD E. COFFIN, OF DETROIT, MICHIGAN.

DUST PAN OR SHIELD FOR AUTOMOBILES.

No. 917,926.   Specification of Letters Patent.   Patented April 13, 1909.

Application filed July 18, 1907. Serial No. 384,302.

*To all whom it may concern:*

Be it known that I, HOWARD E. COFFIN, a citizen of the United States of America, residing at Detroit, in the county of Wayne and State of Michigan, have invented certain new and useful Improvements in Dust Pans or Shields for Automobiles, of which the following is a specification, reference being had therein to the accompanying drawings.

The invention relates to shields for protecting the mechanism beneath the body of an automobile from mud and dust, and the invention consists in the peculiar construction, with particular reference to the means employed for detachably securing the shield to the frame.

In the drawings—Figure 1 is a side elevation of the shield as attached to the vehicle frame; and Fig. 2 is a cross section thereof.

A is the shield or pan, which is preferably of semi-cylindrical cross section, with its opposite end arranged beneath the side bars B of the frame. C is the forward end of this pan, which tapers upward, as shown.

To detachably secure the pan in position, it is provided with longitudinally extending flanges D, which are return bent to engage with the side bars of the frame, these being preferably channel bars, with their flanges turned inward. These channel bars are reinforced with wooden inserts, such as E, the lower edges of which I have beveled at F to leave recesses G for receiving the return bent flanges D.

The sheet material composing the pan A is sufficiently flexible to permit of springing inward the flanges D for engaging or disengaging them from the bars B. To hold them in engagement, clips H are provided, which have shanks I extending through apertures in the sides of the pan, and having springs J sleeved thereon. The head portions K of these clips are provided with hooks L, which engage with apertures in the sides of the channel bars B. With this construction, the tension of the springs J will hold the hooks L in engagement with their sockets, but, at the same time, will permit of withdrawing said hooks and of turning the heads K so as to clear the bars, thereby permitting the disengagement of the flanges D. The return bent flanges D, in conjunction with the coöperating flanges of the bars B, form an absolute dust proof joint between the pan and frame.

Instead of removing the pan by springing the flanges D out of engagement with the flanges of the channel, it is obvious that when the clips are disengaged the whole pan may be slid longitudinally into or out of engagement with the channels.

What I claim as my invention is:

1. The combination with a vehicle frame and a dust pan or shield therebeneath having a flanged engagement therewith, of a clip for holding said pan from displacement comprising a hook for engaging an aperture in the frame, a shank for said hook engaging an aperture in said pan, and a spring for yieldably drawing said shank to engage said hook with said aperture.

2. The combination with a vehicle frame and a dust pan or shield therebeneath having a detachable flanged engagement therewith, of a clip for holding said pan from disengagement comprising a revoluble shank yieldably secured to said pan, and a hook on said shank for engaging an aperture in said frame, said hook being moved by the rotation of said shank to a position for clearing the frame.

3. The combination with a vehicle frame and a dust pan or shield therebeneath, the edges of said shield and frame having a hooked engagement with each other, of fastening means for said hooked engagement comprising a series of clips extending through said shield and yieldably engaging the frame.

4. The combination with a vehicle frame having an inwardly bent flange thereon, of a dust pan or shield beneath said frame having a hooked flange engaging the flanges on the frame, and fastening means for securing the flanges together comprising a series of spring clips secured in bearings in one of said members.

In testimony whereof I affix my signature in presence of two witnesses.

HOWARD E. COFFIN.

Witnesses:
AMELIA WILLIAMS,
NELLIE KINSELLA.